US009328889B2

(12) United States Patent
Anzai

(10) Patent No.: US 9,328,889 B2
(45) Date of Patent: May 3, 2016

(54) VEHICLE LIGHTING UNIT

(71) Applicant: Stanley Electric Co., Ltd., Tokyo (JP)

(72) Inventor: Toshimichi Anzai, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/259,364

(22) Filed: Apr. 23, 2014

(65) Prior Publication Data

US 2014/0321145 A1 Oct. 30, 2014

(30) Foreign Application Priority Data

Apr. 25, 2013 (JP) ................................ 2013-092072

(51) Int. Cl.
*F21S 8/10* (2006.01)
*B60Q 1/00* (2006.01)

(52) U.S. Cl.
CPC ........... *F21S 48/1317* (2013.01); *B60Q 1/0052* (2013.01); *F21S 48/1109* (2013.01); *F21S 48/1154* (2013.01); *F21S 48/1216* (2013.01); *F21S 48/1225* (2013.01); *F21S 48/1241* (2013.01); *F21S 48/1275* (2013.01); *F21S 48/1747* (2013.01); *F21S 48/225* (2013.01); *F21S 48/2262* (2013.01); *F21S 48/2287* (2013.01); *F21S 48/328* (2013.01); *B60Q 2400/30* (2013.01)

(58) Field of Classification Search
CPC ..................................................... F21S 48/1241
See application file for complete search history.

(56) References Cited

U.S. PATENT DOCUMENTS 7,181,378 B2 * 2/2007 Benitez et al. .................... 703/2
2005/0254253 A1 * 11/2005 Yeh ............................... 362/514

* cited by examiner

*Primary Examiner* — Sean Gramling
(74) *Attorney, Agent, or Firm* — Kenealy Vaidya LLP

(57) ABSTRACT

A vehicle lighting unit can include at least one optical module including: first and second light sources; first and second optical member configured to control light from the first and second light sources, respectively; and an outer peripheral optical member configured to surround the first optical member. The first optical member can include an incident surface, and front and rear surfaces and receive light from the first light source through the incident surface and reflect the light by part of the front surface and then part of the rear surface to project the reflected light through part of the front surface. The second optical member is configured to guide the light from the second light source to the outer peripheral optical member so that the light exits through the outer peripheral optical member, and the second light source, and the second optical member are disposed behind the first optical member.

7 Claims, 13 Drawing Sheets

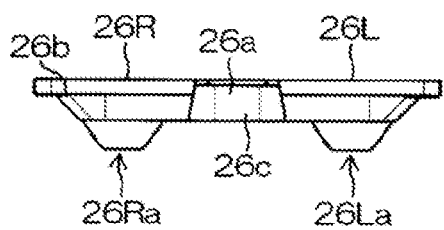
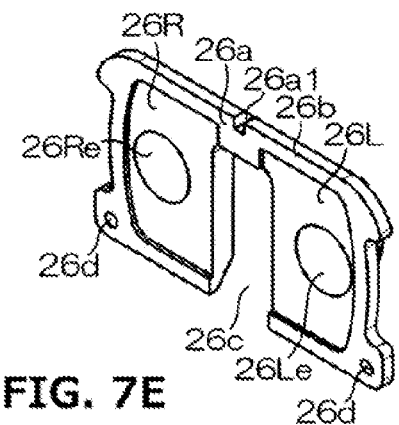
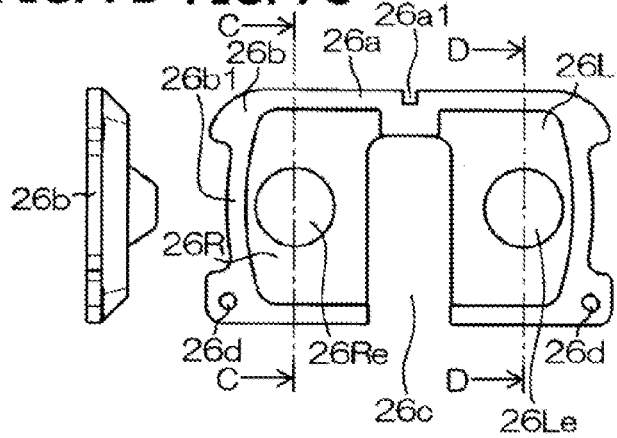
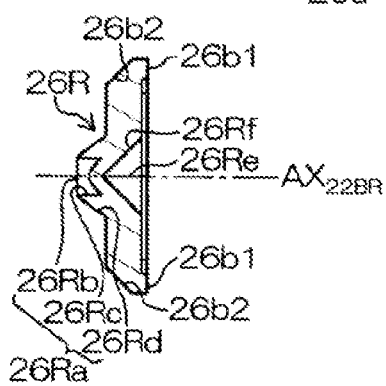
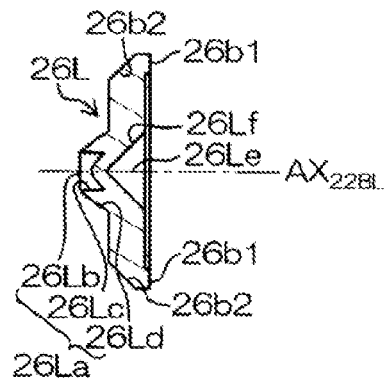

VEHICLE LIGHTING UNIT

This application claims the priority benefit under 35 U.S.C. §119 of Japanese Patent Application No. 2013-092072 filed on Apr. 25, 2013, which is hereby incorporated in its entirety by reference.

TECHNICAL FIELD

The presently disclosed subject matter relates to vehicle lighting units, and in particular, a vehicle lighting unit having a structure in which a light source including a semiconductor light emitting element and an optical member are used in combination.

BACKGROUND ART

In the technical field of conventional vehicle lighting units, combination lamps as illustrated in FIG. 1 have been known, in which various lamps including a low-beam lamp A, a high-beam lamp F, and a daytime running lamp T for indicating the existence of a vehicle during daytime are arranged. (See, for example, Bosch Automotive Handbook, 7th edition, p. 968.)

However, the combination lamp described in the Bosch Automotive Handbook can be configured by arranging the various lamps including the low-beam lamp A, the high-beam lamp F, and the daytime running lamp T at different positions in the front area of a vehicle body as illustrated in FIG. 1. Accordingly, there arises a problem in that it is difficult to arrange the plurality of lamps within a limited area.

SUMMARY

The presently disclosed subject matter was devised in view of these and other problems and features in association with the conventional art. According to an aspect of the presently disclosed subject matter, a vehicle lighting unit can be configured to include a plurality of lamps arranged within a limited area without the above-described problem.

According to another aspect of the presently disclosed subject matter, a vehicle lighting unit can include at least one optical module including: a first light source having a first semiconductor light emitting element; a second light source having a second semiconductor light emitting element; a first optical member configured to control light from the first light source; and a second optical member configured to control light from the second light source. The optical module can further include an outer peripheral optical member configured to surround the first optical member at an outer periphery of the first optical member. The first optical member can include an incident surface, a front surface, and a rear surface and be configured to receive light from the first light source through the incident surface and reflect the light by at least part of the front surface and then by at least part of the rear surface to project the reflected light through at least part of the front surface. The second optical member can be configured to guide the light from the second light source to the outer peripheral optical member so as to allow the light to exit through the outer peripheral optical member. Furthermore, the second light source, and the second optical member can be disposed behind the first optical member.

According to the vehicle lighting unit with the above configuration, a plurality of lamps such as a headlamp, a daytime running lamp, and the like can be arranged within a limited area. This is because the outer peripheral optical member is arranged to surround the first optical member at its outer periphery as well as the structure (including the second light source and the second optical member) for achieving the second lamp (for example, a daytime running lamp) is disposed behind the structure (including the first optical member) for achieving the first lamp (for example, a headlamp) when viewed from the front side of the lighting unit.

According to another aspect of the presently disclosed subject matter, the optical module with the above configuration can further include a support member configured to support the first light source, the second light source, the first optical member, and the second optical member, and the second light source and the second optical member can be disposed between the first optical member and the support member.

According to the vehicle lighting unit with the above configuration, the structure (the second light source and the second optical member) for achieving the second lamp (for example, a daytime running lamp) can be disposed between the first optical member and the support member.

According to another aspect of the presently disclosed subject matter, the vehicle lighting unit with the above configuration can be configured such that the support member can include a base section having a front surface and a seat section projected from the front surface of the base section forward, and the first optical member can have a rear surface arranged in front of an area of the front surface of the base section except for the seat section with the first light source fixed to the seat section and the second light source fixed to the area of the front surface of the base section except for the seat section.

According to the vehicle lighting unit with the above configuration, the same advantageous effects of the presently disclosed subject matter previously described can be obtained.

According to still another aspect of the presently disclosed subject matter, a vehicle lighting unit can include at least one optical module including: a first light source having a first semiconductor light emitting element; a second light source having a second light emitting element; a third light source having a third semiconductor light emitting element; a first optical member configured to control light from the first light source; and a second optical member configured to control light from the second light source and light from the third light source. The optical module can further include an outer peripheral optical member configured to surround the first optical member at an outer periphery of the first optical member. The first optical member can include an incident surface on which light from the first light source can be incident, a pair of front surfaces arranged adjacent to each other in a first direction, and a pair of rear surfaces arranged adjacent to each other in the first direction and be configured to receive light from the first light source through the incident surface and reflect the light by at least part of the pair of front surfaces and then by at least part of the pair of rear surfaces to project the reflected light through at least part of the pair of front surfaces. The second optical member can be configured to guide the light from the second light source and the light from the third light source to the outer peripheral optical member so as to allow the light to exit through the outer peripheral optical member. Furthermore, the second light source, the third light source, and the second optical member can be disposed behind the first optical member.

According to the vehicle lighting unit with the above configuration, a plurality of lamps such as a headlamp, a daytime running lamp, and the like can be arranged within a limited area. This is because the outer peripheral optical member is arranged to surround the first optical member at its outer periphery as well as the structure (including the second light source and the second optical member) for achieving the second lamp (for example, a daytime running lamp) is disposed behind the structure (including the second optical member) for achieving the first lamp (for example, a headlamp) when viewed from the front side of the lighting unit.

According to another aspect of the presently disclosed subject matter, the optical module with the above configuration can further include a support member configured to support the first light source, the second light source, the third light source, the first optical member, and the second optical member, and the second light source, the third light source, and the second optical member can be disposed between the first optical member and the support member.

According to the vehicle lighting unit with the above configuration, the structure (the second light source and the second optical member) for achieving the second lamp (for example, a daytime running lamp) can be disposed between the first optical member and the support member.

According to another aspect of the presently disclosed subject matter, the vehicle lighting unit with the above configuration can be configured such that the support member can include a base section having a front surface and a seat section projected from the front surface of the base section forward with a first area and a second area arranged on respective sides of the seat section, and the pair of rear surfaces of the first optical member can be arranged in front of the first area and the second area, the first light source can be fixed to the seat section, the second light source can be fixed to the first area, and the third light source can be fixed to the second area.

According to the vehicle lighting unit with the above configuration, the same advantageous effects of the presently disclosed subject matter previously described can be obtained.

According to the vehicle lighting unit with the above configuration, a plurality of lamps such as a headlamp, a daytime running lamp, and the like can be arranged within a limited area.

BRIEF DESCRIPTION OF DRAWINGS

These and other characteristics, features, and advantages of the presently disclosed subject matter will become clear from the following description with reference to the accompanying drawings, wherein:

FIG. 7A is a bottom view of a second optical member 26, FIG. 7B is a side view of the same, FIG. 7C is a front view of the same, FIG. 7D is a perspective view of the same, FIG. 7E is a cross-sectional view of the second optical member 26 taken along line C-C shown in FIG. 7C, and FIG. 7F is a cross-sectional view of the second optical member 26 taken along line D-D shown in FIG. 7C;

DESCRIPTION OF EXEMPLARY EMBODIMENTS

A description will now be made below to vehicle lights of the presently disclosed subject matter with reference to the accompanying drawings in accordance with exemplary embodiments.

Figure 1:
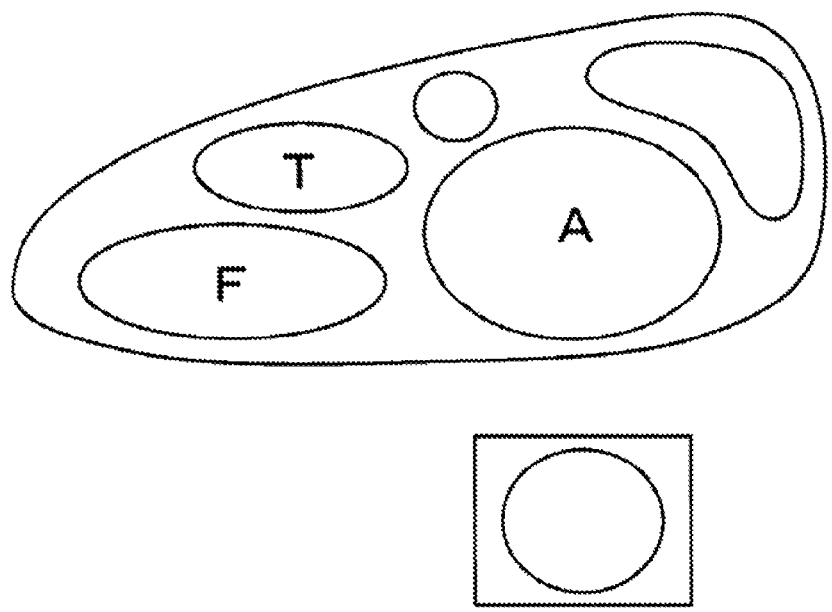
FIG. 1 is a front view of a vehicle lighting unit described in Bosch Automotive Handbook.
Figure 2A:
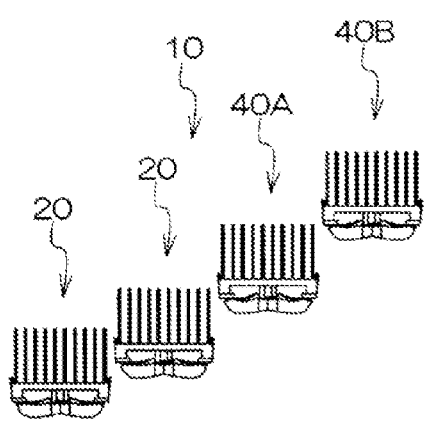
FIG. 2A is a top view of a vehicle lighting unit 10 (excluding an outer peripheral guiding section 32) of an exemplary embodiment made in accordance with principles of the presently disclosed subject matter.
Figure 2C:
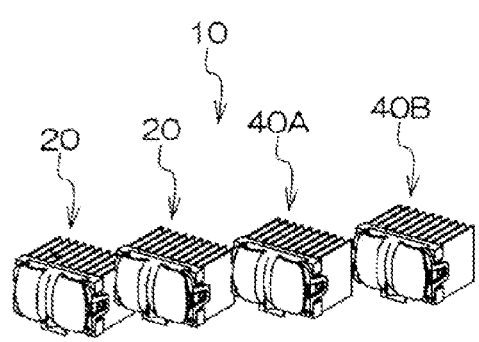
FIG. 2C is a perspective view of the same.
Figure 2B:
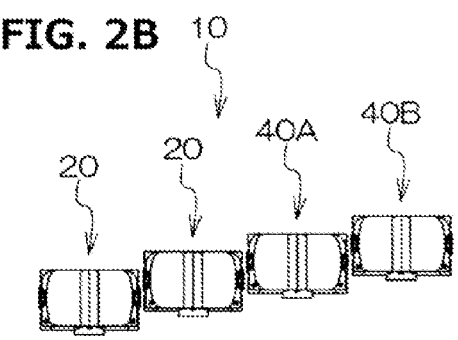
FIG. 2B is a front view of the same.
Figure 2D:
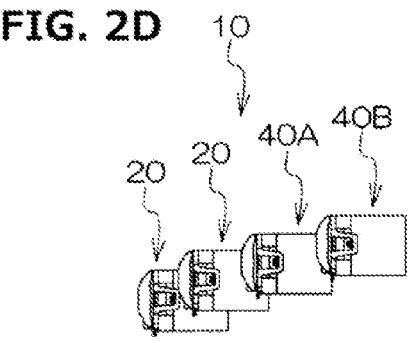
FIG. 2D is a side view of the same.

FIG. 2A is a top view of a vehicle lighting unit 10 (excluding an outer peripheral guiding section 32) of an exemplary embodiment made in accordance with principles of the presently disclosed subject matter, FIG. 2B is a front view of the vehicle lighting unit 10, FIG. 2C is a perspective view of the same, and FIG. 2D is a side view of the same. Note that the vehicle lighting unit 10 can be disposed on left and right front sections of a vehicle such as an automobile and thus have a symmetric configuration, and the illustrated lighting unit 10 is to be mounted on the left side and a description of the left-side lighting unit 10 will be mainly given hereinafter.

As illustrated in FIGS. 2A to 2D, the vehicle lighting unit 10 can include a plurality of optical modules, e.g., four optical modules in the present exemplary embodiment. The four optical modules can include two high-beam optical modules 20 and two low-beam optical modules 40A and 40B. The respective optical modules 20, 40A, and 40B can be arranged in line in a direction that is an obliquely rightward and upward direction when viewed from its front side while they can be arranged more forward as they are closer to the center of the vehicle body. With this arrangement, the respective optical modules 20, 40A, and 40B can be secured to a support member such as a bracket (not shown) so that the distance between their light emission areas becomes a predetermined distance or less, e.g., 15 mm or less. According to the thus configured vehicle lighting unit, the light emission areas of the respective optical modules 20, 20A, and 20B can be recognized as a single light emission area.

First, a description will be given of the high-beam optical module 20.

Figure 3:
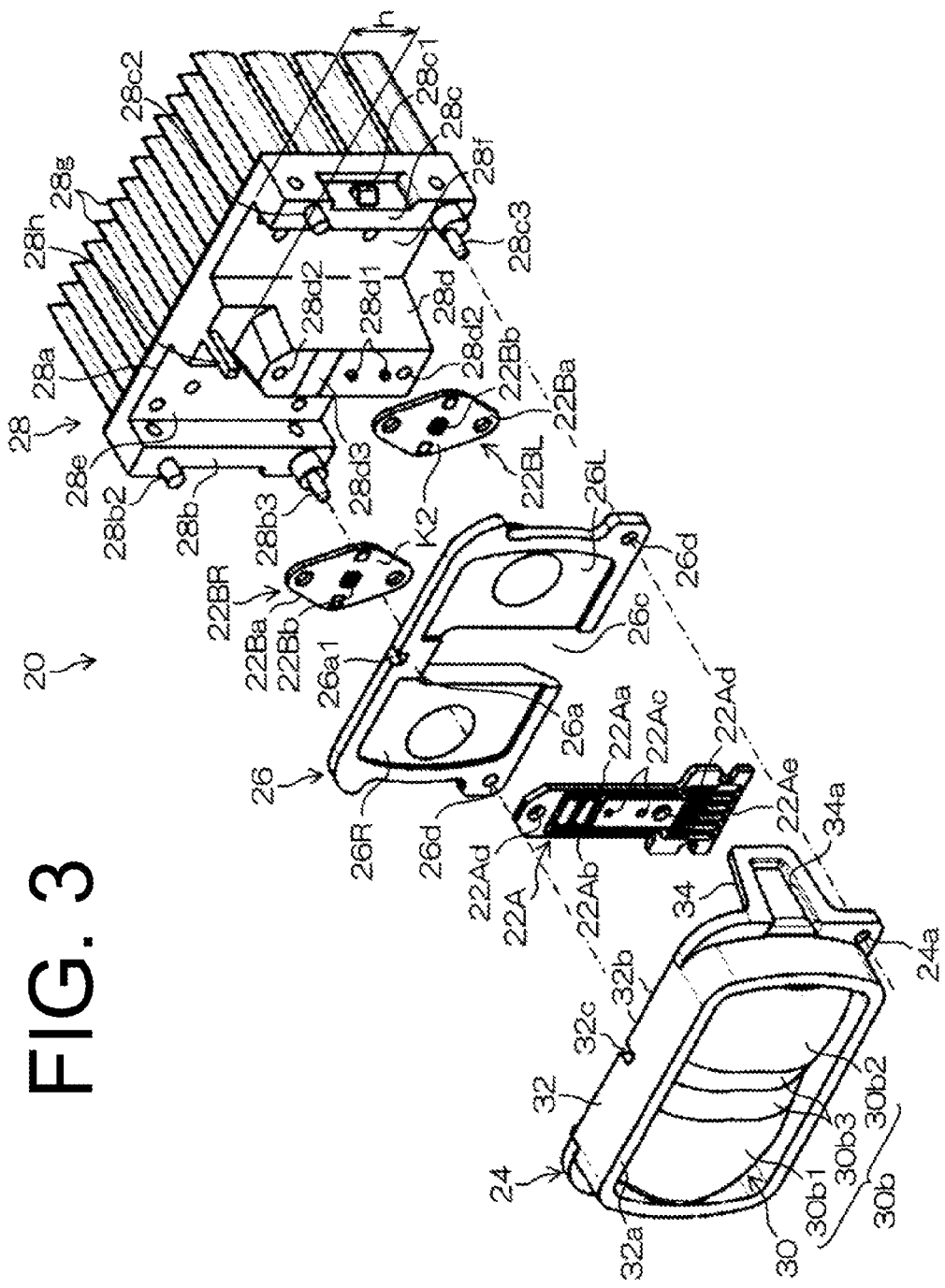
FIG. 3 is an exploded perspective view of a high-beam optical module 20.
Figure 4:
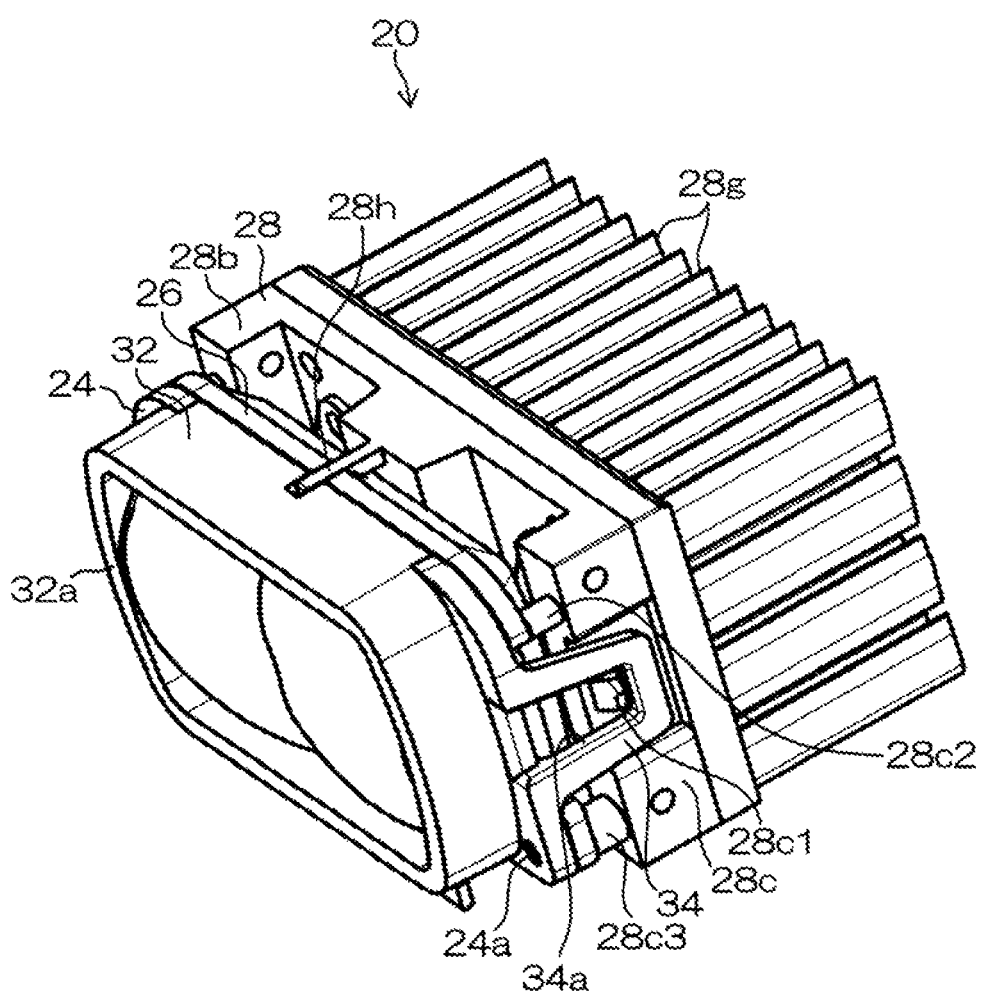
FIG. 4 is a perspective view of the high-beam optical module.
Figure 5A:
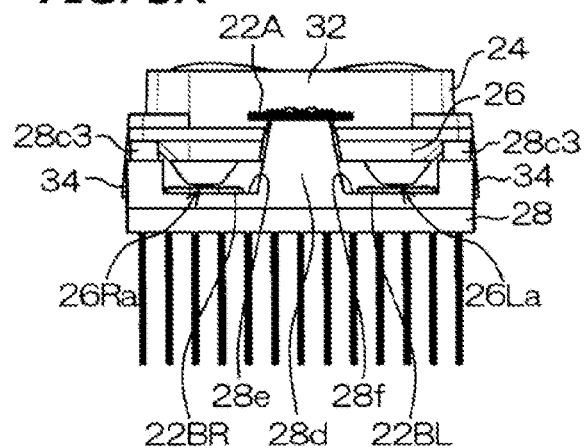
FIG. 5A is a bottom view of the high-beam optical module.
Figure 5B:
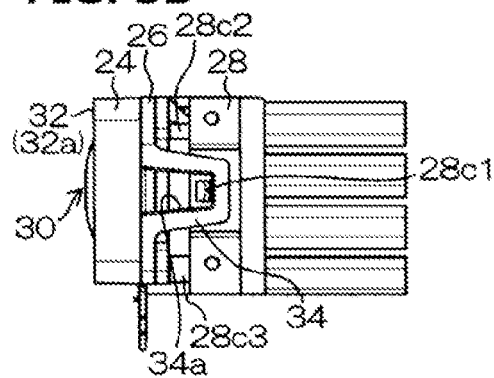
FIG. 5B is a side view of the same.
Figure 5C:
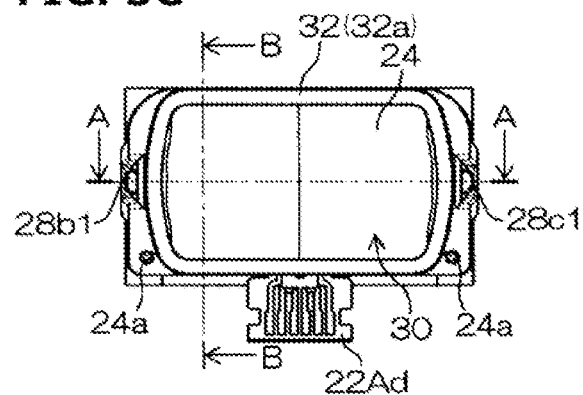
FIG. 5C is a front view of the same.
Figure 5D:
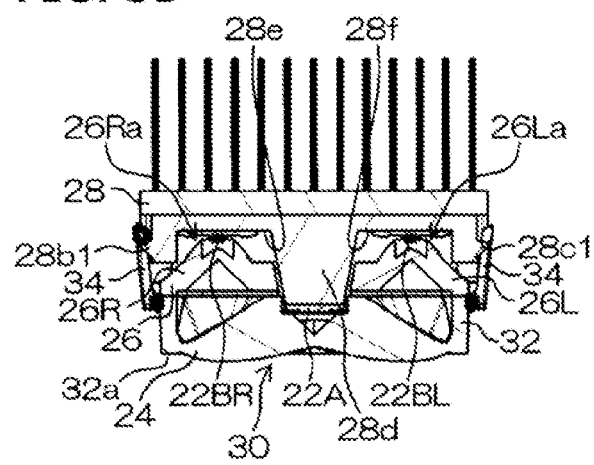
FIG. 5D is a cross-sectional view of the high-beam optical module taken along line A-A shown in FIG. 5C.
Figure 6A:
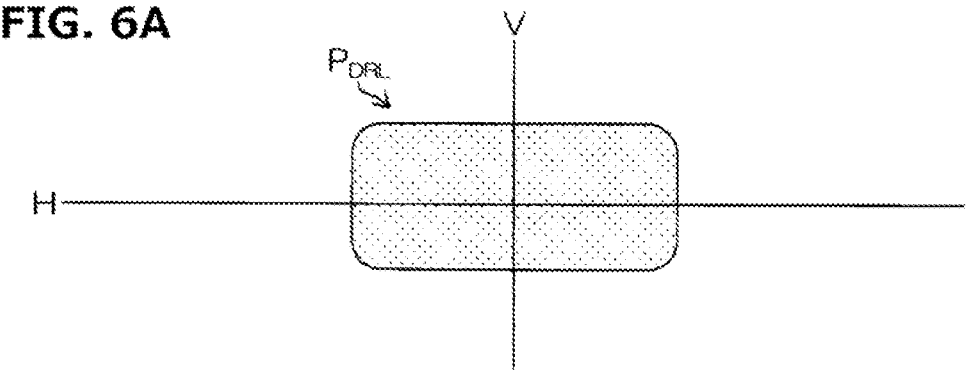
FIG. 6A is a view illustrating an example of a light distribution pattern $P_{DRL}$ formed by a daytime running lamp on a virtual vertical screen (assumed to be arranged about 25 m away from the front surface of a vehicle body in front of the vehicle body)

FIG. 3 is an exploded perspective view of the high-beam optical module 20, and FIG. 4 is a perspective view of the high-beam optical module 20. FIG. 5A is a bottom view of the high-beam optical module 20, FIG. 5B is a side view of the same, FIG. 5C is a front view of the same, and FIG. 5D is a cross-sectional view of the high-beam optical module 20 taken along line A-A shown in FIG. 5C. FIG. 6A is a view illustrating an example of a light distribution pattern $P_{DRL}$ formed by a daytime running lamp on a virtual vertical screen (assumed to be arranged about 25 m away from the front surface of a vehicle body in front of the vehicle body), and FIG. 6C is a view illustrating an example of a high-beam light distribution pattern $P_{Hi}$ formed on the virtual vertical screen.

The two high-beam optical modules 20 can be configured to fond a light collecting area P1 in the high-beam light distribution pattern $P_{Hi}$ (see FIG. 6C) or the light distribution pattern $P_{DRL}$ formed by a daytime running lamp (see FIG. 6A).

As illustrated in FIG. 3, the high-beam optical module 20 can include a center light source 22A (corresponding to the first light source of the presently disclosed subject matter) including a semiconductor light emitting element, a right light source 22BR (corresponding to the second light source of the presently disclosed subject matter) including a semiconductor light emitting element, and a left light source 22BL (corresponding to the third light source of the presently disclosed subject matter) including a semiconductor light emitting element. Further, the high-beam optical module 20 can include a first optical member 24 configured to control the light from the center light source 22A, a second optical member 26 configured to control the light from the left and right light sources 22BL and 22BR, and a support member 28 configured to support these components. These components can be assembled as illustrated in FIGS. 4 and 5A to 5D to form the optical module of a direct projection type.

The support member 28 can be formed from metal, such as die-casting aluminum, and as illustrated in FIG. 3, can include a rectangular base plate section 28a. The base plate section 28a can include a front surface composed of a right projection section 28b and a left projection section 28c configured to be projected forward from both right and left end portions thereof, a seat section 28d configured to be projected forward from the center in the left-to-right direction, and a right area 28e (corresponding to the first area of the presently disclosed subject matter) and a left area 28f (corresponding to the second area of the presently disclosed subject matter) arranged on both sides of the seat section 28d in the left-to-right direction. The respective projection sections 28b and 28c can include latch sections 28b1 and 28c1 (see FIGS. 5B, 5C, and 5D) configured to be engaged with engagement holes 34a of leg sections 34 of the first optical member 24. The base plate section 28a can include a rear surface provided with a plurality of heat dissipation fins 28g formed at predetermined intervals in the horizontal direction, for example.

On the front end surfaces of the respective projection sections 28b and 28c, abutment pins 28b2 and 28c2 and positioning pins 28b3 and 28c3 can be formed. The abutment pins 28b2 and 28c2 are pins to abut to the rear surface of the second optical member 26. The positioning pins 28b3 and 28c3 are pins to be inserted into positioning holes 24a and 26d formed in the first optical member 24 and the second optical member 26.

The seat section 28d can extend from the lower edge of the base plate section 28a to the position a predetermined distance h away from the upper edge of the base plate section 28a. A positioning pin 28h extending forward from the front surface of the base plate section 28a can be disposed at the upper portion of the seat section 28d. The positioning pin 28h is a pin to be inserted to cutout sections 32c and 26a1 for positioning, formed in the first optical member 24 and the second optical member 26.

On the front surface of the seat section 28d, a positioning pin 28d1, a screw hole 28d2, and a groove section 28d3 for a heat conductive member can be formed. The positioning pin 28d1 is a pin to be inserted into a positioning hole 22Ac formed in the center light source 22A at its substrate 22Aa.

As illustrated in FIG. 3, the center light source 22A can include the substrate 22Aa formed of metal, and a semiconductor light emitting element 22Ab mounted on the surface of the substrate 22Aa. The semiconductor light emitting element 22Ab can be configured to include, for example, four square light emitting diodes each having a 1 mm side. The semiconductor light emitting element 22Ab can be one that can include a blue LED and a yellow phosphor such as a YAG phosphor covering the LED in combination. The light emitting diodes can be mounted on the surface of the substrate 22Aa at predetermined distance in line to configure an elongated rectangular light emission surface (light emission section) as a whole.

Note that the semiconductor light emitting element 22Ab may be a semiconductor light emitting element having a structure in which RGB LEDs (or laser diodes) are combined, or may be a semiconductor light emitting element having other structures. Further, the number of the semiconductor light emitting element 22Ab is not limited to one, but may be two or more.

The center light source 22A can be supported by the support member 28 (seat section 28d) so as to be disposed between the first optical member 24 and the support member 28. Specifically, the center light source 22A can be positioned with respect to the support member 28 by inserting the positioning pin 28d1 of the support member 28 (seat section 28d) into the positioning hole 22Ac formed in the substrate 22Aa. Then, the center light source 22A can be secured to the support member 28 (seat section 28d) by screwing a not-illustrated screw inserted to the through hole 22Ad formed in the substrate 22Aa into the screw hole 28d2 of the support member 28 (seat section 28d). The center light source 22A can be fixed with the light emission face (light emission section) thereof facing forward.

From the viewpoint of enhancing the heat conducing property between the center light source 22A and the support member 28, a not-illustrated heat conducting member, such as a heat conducting grease (thermal grease) and a heat conducting sheet, can be disposed between the center light source 22A (the rear surface of the substrate 22Aa) and the support member 28 (the groove section 28d3 for a heat conductive member formed on the front surface of the seat section 28d).

With this configuration, a heat dissipation path for dissipating heat generated by the semiconductor light emitting element 22Ab in the center light source 22A can be formed from the substrate 22Aa via the heat conducting member, the seat section 28d, and the base section 28a to the heat dissipation fins 28g.

The semiconductor light emitting element 22Ab can be driven by a driving current supplied from a coupler (not illustrated) to be attached to the lower end section 22Ae of the substrate 22Aa through a wiring pattern formed on the substrate 22Aa.

As illustrated in FIG. 3, the right light source 22BR (similar to the left light source 22BL) can be a light source having a light distribution with a width substantially coincident with that of a Lambertian emission. For example, the right light source 22BR can include a substrate 22Ba formed of metal and a semiconductor light emitting element 22Bb mounted on the surface of the substrate 22Ba. The semiconductor light emitting element 22Bb can be a single light emitting diode having a square light emission surface with 1 mm side. The semiconductor light emitting element 22Bb can be one that can include a blue LED and a yellow phosphor such as a YAG phosphor covering the LED in combination.

Note that the semiconductor light emitting element 22Bb may be a semiconductor light emitting element having a structure in which RGB LEDs (or laser diodes) are combined, or may be a semiconductor light emitting element having other structures. Further, the number of the semiconductor light emitting element 22Bb is not limited to one, but may be two or more.

The right light source 22BR can be secured to the right area 28e of the support member 28 (the front surface of the base plate section 28a) by screwing. In the same manner, the left light source 22BL can be secured to the left area 28f of the support member 28 (the front surface of the base plate section 28a) by screwing. The right light source 22BR (also left light source 22BL) can be fixed with the light emission face (light emission section) thereof facing forward.

FIG. 7A is a bottom view of the second optical member 26, FIG. 7B is a side view of the same, FIG. 7C is a front view of the same, FIG. 7D is a perspective view of the same, FIG. 7E is a cross-sectional view of the second optical member 26 taken along line C-C shown in FIG. 7C, and FIG. 7F is a cross-sectional view of the second optical member 26 taken along line D-D shown in FIG. 7C.

The second optical member 26 can be formed from a transparent resin such as acrylic resin and polycarbonate resin. As illustrated in FIGS. 7A to 7F, the second optical member 26 can include a right light guiding section 26R, a left light guiding section 26L, a connecting section 26a, and an outer peripheral light guiding section 26b, which can be integrally injection-molded to form the second optical member 26.

The right and left light guiding sections 26R and 26L can be disposed at a certain space to be adjacent to each other, and the connecting section 26a can connect the upper sections of the right and left light guiding sections 26R and 26L. With this configuration, a cutout section 26c to which the seat section 28d of the support member 28 can be inserted can be formed between the right and left light guiding sections 26R and 26L and below the connecting section 26a. The connecting section 26a can include the cutout section 26a1 formed therein so that the positioning pin 28h disposed at the upper portion of the seat section 28d of the support member 28.

The second optical member 26 can be configured to guide the light emitted from the right light source 22BR and the left light source 22BL to the outer peripheral light guiding section 26b to exit from the peripheral light guiding section 26b (the front surface 26b1).

Specifically, in order to achieve the guiding of light, the second optical member 26 can have the following configuration.

As illustrated in FIG. 7E, a right light incident section 26Ra can be provided at a position of the rear surface of the right light guiding section 26R opposite to the right light source 22BR. The right light incident section 26Ra can have a rotationally symmetric shape with an optical axis $AX_{22BR}$ of the right light source 22BR as a rotation axis.

The right light incident section 26Ra can include a first light incident surface 26Rb disposed on the optical axis $AX_{22BR}$ of the right light source 22BR, a second light incident surface 26Rc configured as a cylindrical surface extending from the periphery of the first light incident surface 26Rb toward the right light source 22BR to surround the optical axis $AX_{22BR}$ ahead of the right light source 22BR, and a cylindrical first reflecting surface 26Rd surrounding the second light incident surface 26Rc at the outer periphery of the second light incident surface 26Rc.

The first light incident surface 26Rb can be configured to receive the light from the right light source 22BR to collimate the light in parallel with the optical axis $AX_{22BR}$ of the right light source 22BR.

The first reflecting surface 26Rd can be configured to receive the light emitted from the right light source 22BR and having entered the inside of the right light guiding section 26R through the second light incident surface 26Rc and reflect the same to collimate the light in parallel with the optical axis $AX_{22BR}$ of the right light source 22BR.

Furthermore, a conical recessed section 26Re can be formed at a position of the front surface of the right light guiding section 26R opposite to the first light incident surface 26Rb and the first reflecting surface 26Rd. The conical recessed section 26Re can form a conical second reflecting surface 26Rf configured to internally reflect the light having entered the inside of the right light guiding section 26R through the right incident section 26Ra along a plane perpendicular to the optical axis $AX_{22BR}$ of the right light source 22BR in a radially spread direction.

As illustrated in FIG. 7F, a left light incident section 26La can be provided at a position of the rear surface of the left light guiding section 26L opposite to the left light source 22BL. The left light incident section 26La can have a rotationally symmetric shape with an optical axis $AX_{22BL}$ of the left light source 22BL as a rotation axis.

The left light incident section 26La can include a first light incident surface 26Lb disposed on the optical axis $AX_{22BL}$ of the left light source 22BL, a second light incident surface 26Lc configured as a cylindrical surface extending from the periphery of the first light incident surface 26Lb toward the left light source 22BL to surround the optical axis $AX_{22BL}$ ahead of the left light source 22BL, and a cylindrical first reflecting surface 26Ld surrounding the second light incident surface 26Lc at the outer periphery of the second light incident surface 26Lc.

The first light incident surface 26Lb can be configured to receive the light from the left light source 22BL to collimate the light in parallel with the optical axis $AX_{22BL}$ of the left light source 22BL.

The first reflecting surface 26Ld can be configured to receive the light emitted from the left light source 22BL and having entered the inside of the left light guiding section 26L through the second light incident surface 26Lc and reflect the same to collimate the light in parallel with the optical axis $AX_{22BL}$ of the left light source 22BL.

Furthermore, a conical recessed section 26Le can be formed at a position of the front surface of the left light guiding section 26L opposite to the first light incident surface 26Lb and the first reflecting surface 26Ld. The conical recessed section 26Le can form a conical second reflecting surface 26Lf configured to internally reflect the light having entered the inside of the left light guiding section 26L through the left incident section 26La along a plane perpendicular to the optical axis $AX_{22BL}$ of the left light source 22BL in a radially spread direction.

As illustrated in FIGS. 7C and 7D, the outer peripheral light guiding section 26b can be disposed to surround the right and left light guiding sections 26R and 26L except for the cutout section 26c at the outer peripheries of the right and left light guiding sections 26R and 26L.

As illustrated in FIGS. 7E and 7F, the outer peripheral light guiding section 26b can include a front surface 26b1 and a rear surface 26b2.

The front surface 26b1 can be disposed to surround the right and left light guiding sections 26R and 26L except for the cutout section 26c at the outer peripheries of the right and left light guiding sections 26R and 26L. Similarly, the rear surface 26b2 can be disposed to surround the right and left light guiding sections 26R and 26L except for the cutout section 26c at the outer peripheries of the right and left light guiding sections 26R and 26L. The rear surface 26b2 can function as a reflecting surface configured to internally reflect the light that has been internally reflected by the second reflecting surfaces 26Rf and 26Lf and radially traveled through the inside of the right and left light guiding sections 26R and 26L, toward the front surface 26b1.

The front surface 26b1 can be configured to be a plane perpendicular to the optical axes $AX_{22BR}$ and $AX_{22BL}$ and of the right and left light sources 22BR and 22BL.

Figure 9A:
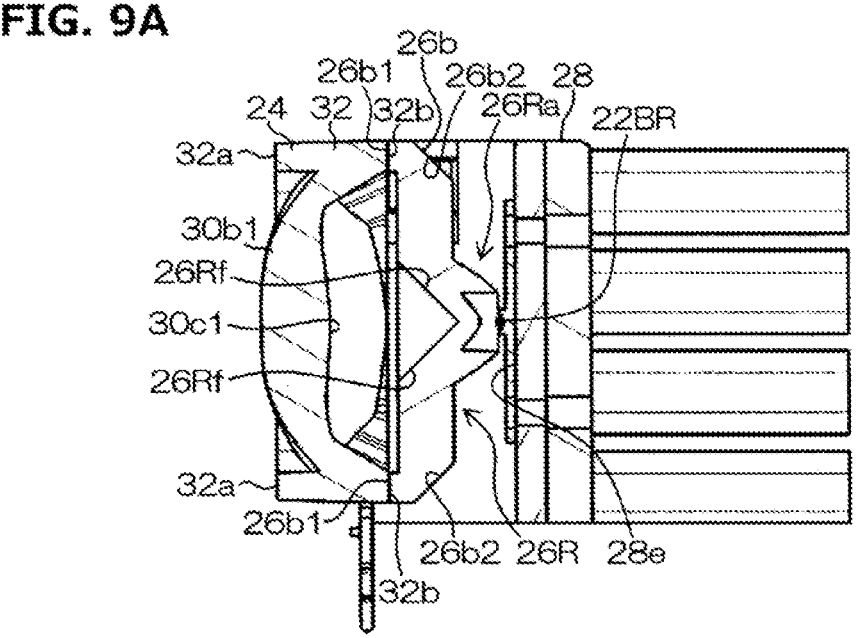
FIG. 9A is a cross-sectional view of the high-beam optical module 20 illustrated in FIG. 5C.
Figure 9B:
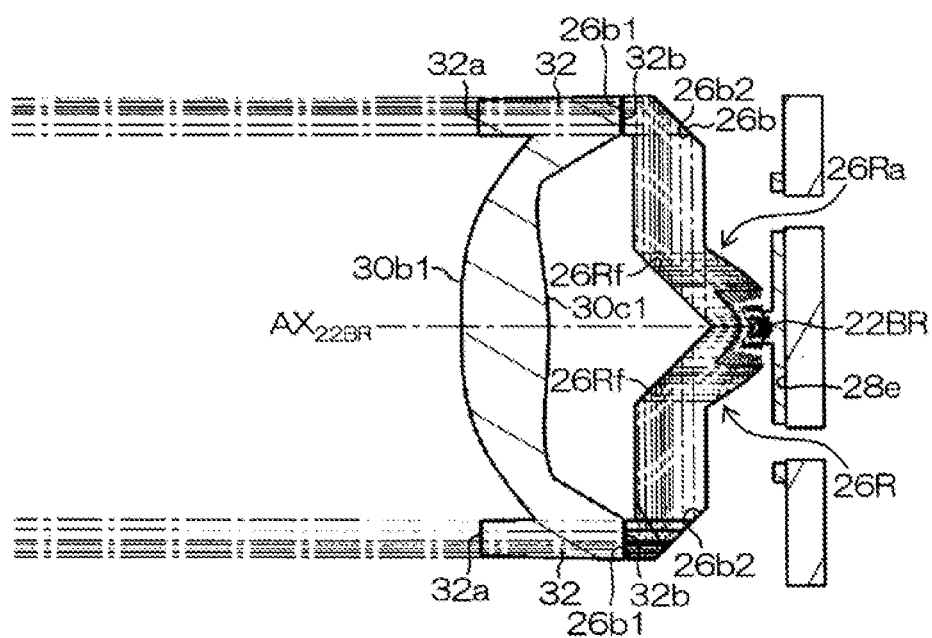
FIG. 9B is a cross-sectional view illustrating how light from the right-side light source 22BR is guided through the second optical member 26.

In the second optical member 26 with the above-described configuration, as illustrated in FIG. 9B, when the right light source 22BR is turned on to emit light, the light can enter the right light guiding section 26R through the right light incident section 26Ra. Then, the light having entered can be internally reflected by the second reflecting surface 26Rf to radially travel along a plane perpendicular to the optical axis $AX_{22BR}$. The reflected light can be further internally reflected by the rear surface 26b2 toward the front surface 26b1 of the outer peripheral light guiding section 26b to exit through the front surface 26b1. In the same manner, the light from the left light source 22BL can enter the left light guiding section 26L through the left light incident section 26La. Then, the light having entered can be internally reflected by the second reflecting surface 26Lf to radially travel along a plane perpendicular to the optical axis $AX_{22BL}$. The reflected light can be further internally reflected by the rear surface 26b2 toward the front surface 26b1 of the outer peripheral light guiding section 26b to exit through the front surface 26b1.

Figure 8A:
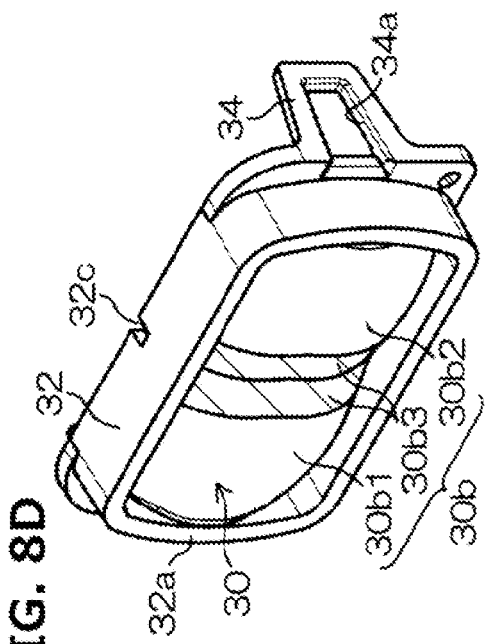
FIG. 8A is a bottom view of a first optical member 24.
Figure 8B:
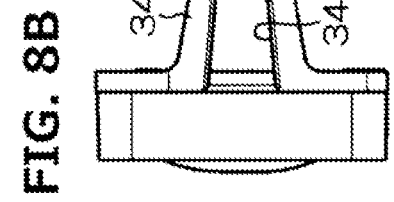
FIG. 8B is a side view of the same.
Figure 8C:
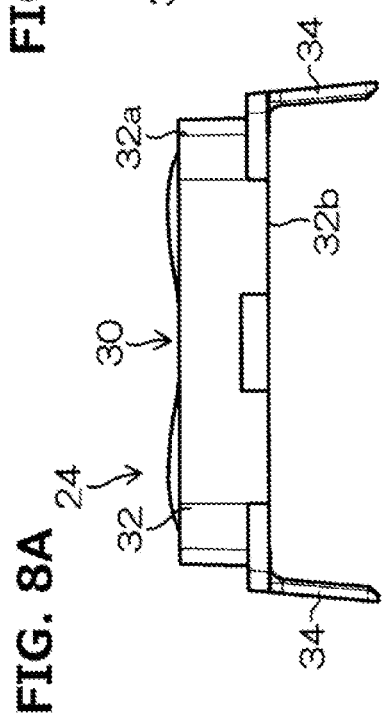
FIG. 8C is a front view of the same.
Figure 8D:
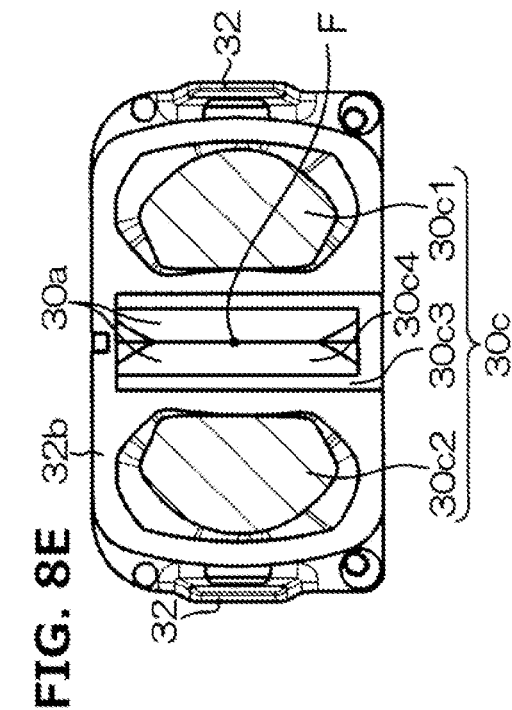
FIG. 8D is a perspective view of the same.
Figure 8E:
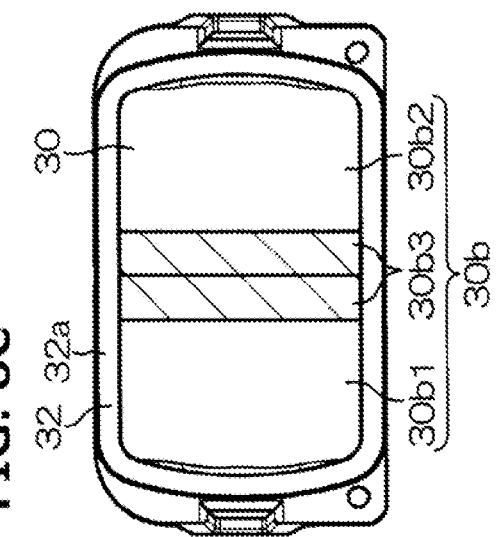
FIG. 8E is a rear side view of the same.

FIG. 8A is a bottom view of the first optical member 24, FIG. 8B is a side view of the same, FIG. 8C is a front view of the same, FIG. 8D is a perspective view of the same, and FIG. 8E is a rear side view of the same.

The first optical member 24 can be formed from a transparent resin such as acrylic resin and polycarbonate resin. As illustrated in FIGS. 8A to 8E, the first optical member 24 can include a first optical member main body 30, an outer peripheral light guiding section 32 (corresponding to the outer peripheral optical member of the presently disclosed subject matter), and a pair of leg sections 34 extending from respective sides of the outer peripheral light guiding section 32 toward the support member 28, which can be integrally injection-molded to form the first optical member 24.

The first optical member main body 30 can include a light incident surface 30a through which the light emitted from the center light source 22A can enter, a pair of front surfaces 30b disposed to be adjacent to each other in the right-to-left direction, being a right front surface 30b1 and a left front surface 30b2, and a pair of rear surfaces 30c disposed to be adjacent to each other in the right-to-left direction, being a right rear surface 30c1 and a left rear surface 30c2. Furthermore, the first optical member main body 30 can include a reference point F used for an optical design (such as a reference point for disposing a light source) on the light incident surface 30a side. The pair of rear surface 30c including the right rear surface 30c1 and the left rear surface 30c2 can be arranged in front of the right area 28e and the left area 28f of the support member 28, respectively.

The first optical member main body 30 can be configured such that the light emitted from the center light source 22A can enter the first optical member main body 30 through the light incident surface 30a and be reflected by at least part of the pair of front surfaces 30b including the right and left front surfaces 30b1 and 30b2, and further be reflected by at least part of the pair of rear surfaces 30c including the right and left rear surfaces 30b1 and 30b2, and then exit through at least part of the pair of front surfaces 30b including the right and left front surfaces 30b1 and 30b2 to be projected forward.

As illustrated in FIGS. 8C and 8D, the front surfaces 30b of the first optical member main body 30 can include the right front surface 30b1 disposed in front of the right rear surface 30c1, the left front surface 30b2 disposed in front of the left rear surface 30c2, and an intermediate area 30b3 between the right and left front surfaces 30b1 and 30b2.

The right and left front surfaces 30b1 and 30b2 can be areas in which the light from the center light source 22a and incident on the light incident surface 30a can be totally reflected by an area where the incident angle of the light exceeds a critical angle, to the rear surfaces 30c including the right and left rear surfaces 30c1 and 30c2 as well as areas through which the light reflected from the rear surfaces 30c including the right and left rear surfaces 30c1 and 30c2 exit.

The intermediate area 30b3 can be an area where the incident angle of the light from the center light sourced 22A and incident on the light incident surface 30a is smaller than the critical angle as well as an area by which the light incident on the light incident surface 30a by an angle smaller than the critical angle to the rear surfaces 30c including the right and left rear surfaces 30c1 and 30c2. In order to reflect the light incident on the light incident surface 30a at an angle smaller than the critical angle toward the rear surfaces 30c, the intermediate area 30b3 can include a reflection film formed thereon by aluminum deposition or the like mirror finishing. (See the hatched areas in FIGS. 8C and 8D.)

As illustrated in FIG. 8E, the rear surface 30c of the first optical member main body 30 can include, in the rear surfaces 30c, a rectangular groove section 30c3 formed at a position opposite to the seat section 28d of the support member 28, a V-shaped groove section 30c4 including the light incident surface 30a and formed on the bottom of the rectangular groove section 30c3, and the right and left rear surfaces 30c1 and 30c2 disposed on respective sides of the rectangular groove section 30c3 (V-shaped groove section 30c4).

As discussed above, the right and left rear surfaces 30c1 and 30c2 can reflect the light, having been reflected from the front surfaces 30b, to the front surfaces 30b including the right and left front surfaces 30b1 and 30b2 to project the light through the front surfaces 30b. In order to reflect the light having been reflected from the front surfaces 30*b* to the front surfaces 30*b*, the right and left rear surfaces 30*c*1 and 30*c*2 can include a reflection film formed thereon by aluminum deposition or the like mirror finishing. (See the hatched areas in FIG. 8E.)

The rectangular groove section 30*c*3 can be a groove section into which the tip end of the seat section 28*d* of the support member 28 can be inserted. The rectangular groove section 30*c*3 can be configured to be vertically long at a position opposite to the seat section 28*d* of the support member 28 within the rear surfaces 30*c* of the first optical member main body 30.

The V-shaped groove section 30*c*4 can be configured to be vertically long at the bottom of the rectangular groove section 30*c*3. The V-shaped groove section 30*c*4 can include right and left surfaces serving as a pair of light incident surfaces 30*a*. (See FIG. 8E.) Note that the right and left surfaces constituting the V-shaped groove section 30*c*4 may be a planar surface or a curved surface.

The reference point F of the first optical member 24 (or the first optical member main body 30) may be located within the V-shaped groove section 30*c*4 or may be out of the V-shaped groove section 30*c*4. In the present exemplary embodiment, in order to enhance the light incident efficiency to the first optical member 24, the reference point F of the first optical member 24 is located within the V-shaped groove section 30*c*4.

At least one of the light incident surface 30*a*, the front surfaces 30*b*, and the rear surfaces 30*b* can be designed in terms of surface design such that the light emitted from the center light source 22A and incident on the light incident surface 30*a* to enter the inside of the first optical member main body 30 can be reflected by the front surfaces 30*b* and the rear surfaces 30*c* (including the right and left rear surfaces 30*c*1 and 30*c*2) and then projected forward through the front surfaces 30*b* (including the right and left front surfaces 30*b*1 and 30*b*2) to form a light collecting area P1 in the high-beam light distribution pattern $P_{Hi}$ on a virtual vertical screen (see FIG. 6C). U.S. Pat. No. 7,460,985 can be referred to as the design technique for the respective surfaces, which is hereby incorporated in its entirety by reference.

As illustrated in FIGS. 8C and 8D, the outer peripheral light guiding section 32 (corresponding to the outer peripheral optical member of the presently disclosed subject matter) can be configured to surround the first optical member 24 (first optical member main body 30) at the outer periphery of the first optical member 24 (first optical member main body 30).

The outer peripheral light guiding section 32 can include a front surface 32*a* and a rear surface 32*b*. As illustrated in FIG. 9B, the rear surface 32*b* of the outer peripheral light guiding section 32 can be a surface on which the light exiting through the front surface 26*b*1 of the outer peripheral light guiding section 26 of the second optical member 26 can be incident. The front surface 32*a* of the outer peripheral light guiding section 32 can be a surface through which the light having entered the outer peripheral light guiding section 32 through the rear surface 32*b* can exit. In the present exemplary embodiment, the front surface 23*a* and the rear surface 32*b* of the outer peripheral light guiding section 32 of the first optical member 24 (first optical member main body 30) can be a plane perpendicular to the optical axis $AX_{22BR}$ ($AX_{22BL}$).

The first and second optical members 24 and 26 can be supported by the support member 28 in the following manner.

As illustrated in FIG. 3, the positioning pins 28*b*3 and 28*c*3 of the support member 29 can be inserted to the positioning holes 26*d* formed in the second optical member 26 while the positioning pin 28*h* can be inserted into the cutout section 26*a*1 formed in the connecting section 26*a*, so that the seat section 28*d* of the support member 20, to which the center light source 22A is secured, can be inserted into the cutout section 26*c* of the second optical member 26. In this manner, the second optical member 26 can be positioned with respect to the support member 28.

Next, the positioning pins 28*b*3 and 28*c*3 of the support member 28 can be inserted into the positioning holes 24*a* formed in the first optical member 26 while the positioning pin 28*h* of the support member 28 can be inserted into the cutout section 32*c* formed in the outer peripheral light guiding section 32, so that the seat section 28*d* of the support member 20, to which the center light source 22A is secured, can be inserted into the rectangular groove section 30*c*3 of the first optical member 24. In this manner, the first optical member 24 can be positioned with respect to the second optical member 26 and the support member 28.

Then, the latch sections 28*b*1 and 28*c*1 of the support member 28 can be engaged with the engagement holes 34*a* of the leg sections 34 of the first optical member 24. Thus, the first optical member 24 can be secured to the support member 28. At the same time, the second optical member 26 can be sandwiched between the first optical member 24 at the rear surface 32*b* of the outer peripheral light guiding section 32 and the support member 28 at the positioning pins 28*b*3 and 28*c*3 (larger diameter portions at the bases) and the abutting pins 28*b*2 and 28*c*2 of the support member 28. In the sandwiched state, the rear surface 32*b* of the outer peripheral light guiding section 32 of the first optical member 24 can be in surface-contact with the front surface 26*b*1 of the outer peripheral light guiding section 26*b* of the second optical member 26. The optical module 20 with the above configuration can include an optical path, as illustrated in FIGS. 9A and 9B, through which the light emitted from the right light source 22BR and incident on the right light incident section 26Ra of the second optical member 26 and the light emitted from the left light source 22BL and incident on the left light incident section 26La of the second optical member 26 can be guided toward the outer peripheral light guiding section 32 of the first optical member 24 to be projected forward through the front surface 32*a* of the outer peripheral light guiding section 32. The right light source 22BR, the left light source 22BL, and the second optical member 24 can be disposed behind the first optical member 24 and between the first optical member 24 and the support member 28 when viewed from the module front side. (See, for example, FIGS. 4A to 4D.) The center light source 22A (horizontally elongated light emission surface) can be located at or substantially near the reference point F of the first optical member 24 (first optical member main body 30).

Although the first optical member 24 and the support member 28 are engaged with each other through the latch sections and the engagement holes, they can be engaged with each other by screwing or other means.

A description will now be given of the low-beam optical module 40A.

Figure 6B:
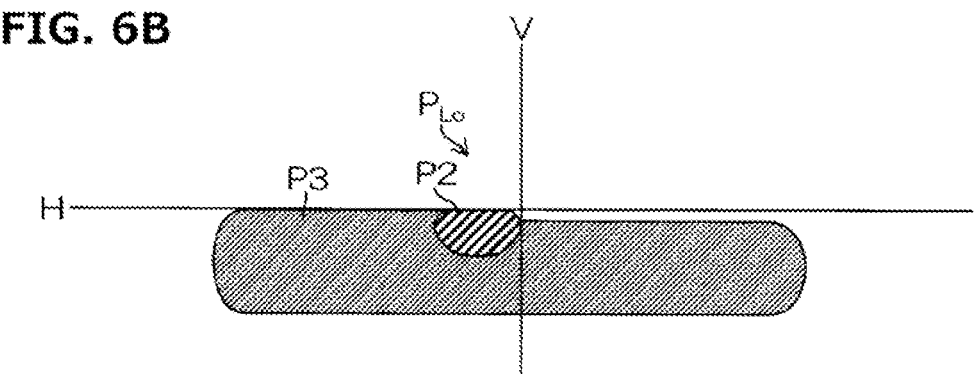
FIG. 6B is a view illustrating an example of a low-beam light distribution pattern $P_{Lo}$ formed on the virtual vertical screen.
Figure 6C:
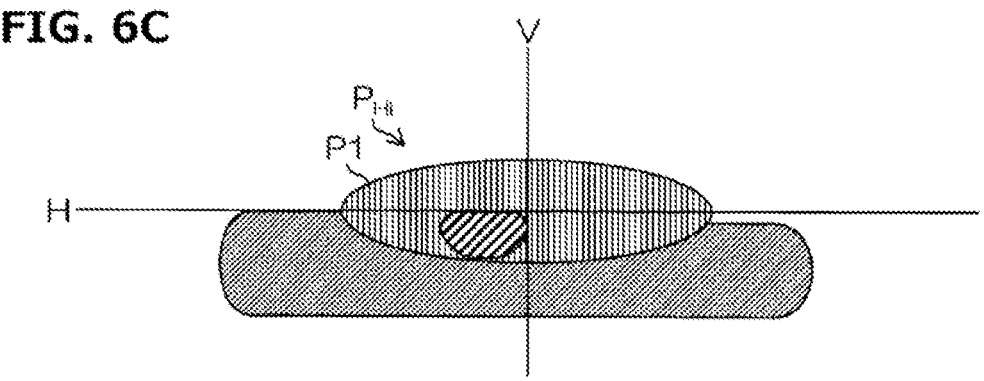
FIG. 6C is a view illustrating an example of a high-beam light distribution pattern $P_{Hi}$ formed on the virtual vertical screen.

FIG. 6B is a view illustrating an example of a low-beam light distribution pattern $P_{Lo}$ formed on the virtual vertical screen.

The low-beam optical module 40A can be configured to form a light collecting area P2 in the low-beam light distribution pattern $P_{Lo}$ (see FIG. 6B) or the light distribution pattern $P_{DR}$, formed by a daytime running lamp (see FIG. 6A).

As in the high-beam optical module 20, the low-beam optical module 40A can include a center light source 22A (corresponding to the first light source of the presently disclosed subject matter) including a semiconductor light emitting element, a right light source 22BR (corresponding to the second light source of the presently disclosed subject matter) including a semiconductor light emitting element, and a left light source 22BL (corresponding to the third light source of the presently disclosed subject matter) including a semiconductor light emitting element. Further, the low-beam optical module 40A can include a first optical member 24 configured to control the light from the center light source 22A, a second optical member 26 configured to control the light from the left and right light sources 22BL and 22BR, and a support member 28 configured to support these components. These components can be assembled as illustrated in FIGS. 4 and 5A to 5D to form the optical module of a direct projection type.

The low-beam optical module 40A can be different from the high-beam optical module 20 in the following point. Specifically, at least one of the light incident surface 30a, the front surfaces 30b, and the rear surfaces 30b of the first optical member main body 30 can be designed in terms of surface design such that the light emitted from the center light source 22A and incident on the light incident surface 30a to enter the inside of the first optical member main body 30 can be reflected by the front surfaces 30b and the rear surfaces 30c (including the right and left rear surfaces 30c1 and 30c2) and then projected forward through the front surfaces 30b (including the right and left front surfaces 30b1 and 30b2) to form a light collecting area P2 in the low-beam light distribution pattern $P_{Lo}$ on a virtual vertical screen (see FIG. 6B).

A description will now be given of the low-beam optical module 40B.

The low-beam optical module 40B can be configured to form a light diffusion area P3 in the low-beam light distribution pattern $P_{Lo}$ (see FIG. 6B) or the light distribution pattern $P_{DRL}$ formed by a daytime running lamp (see FIG. 6A).

As in the high-beam optical module 20, the low-beam optical module 40B can include a center light source 22A (corresponding to the first light source of the presently disclosed subject matter) including a semiconductor light emitting element, a right light source 22BR (corresponding to the second light source of the presently disclosed subject matter) including a semiconductor light emitting element, and a left light source 22BL (corresponding to the third light source of the presently disclosed subject matter) including a semiconductor light emitting element. Further, the low-beam optical module 40B can include a first optical member 24 configured to control the light from the center light source 22A, a second optical member 26 configured to control the light from the left and right light sources 22BL and 22BR, and a support member 28 configured to support these components. These components can be assembled as illustrated in FIGS. 4 and 5A to 5D to form the optical module of a direct projection type.

The low-beam optical module 40B can be different from the high-beam optical module 20 in the following point. Specifically, at least one of the light incident surface 30a, the front surfaces 30b, and the rear surfaces 30b of the first optical member main body 30 can be designed in terms of surface design such that the light emitted from the center light source 22A and incident on the light incident surface 30a to enter the inside of the first optical member main body 30 can be reflected by the front surfaces 30b and the rear surfaces 30c (including the right and left rear surfaces 30c1 and 30c2) and then projected forward through the front surfaces 30b (including the right and left front surfaces 30b1 and 30b2) to form a light diffusion area P2 in the low-beam light distribution pattern $P_{Lo}$ on a virtual vertical screen (see FIG. 6B).

A description will now be given of the operation example of the respective optical modules 20, 40A, and 40B (switching between the high-beam light distribution pattern $P_{Hi}$, the low-beam light distribution pattern $P_{Lo}$, and the light distribution pattern $P_{DRL}$ formed by a daytime running lamp).

The respective light distribution patterns $P_{Hi}$, $P_{Lo}$, and $P_{DRL}$ can be switched by the control by means of a control circuit (not illustrated) such as an ECU electrically connected to the respective optical modules 20, 40A, and 40B for controlling the respective center light sources 22A, and right and left light sources 22BR and 22BL.

The control circuit can independently control the respective optical modules 20, 40A, and 40B (the respective center light sources 22A, and right and left light sources 22BR and 22BL) to turn it ON or OFF, thereby switching between the high-beam light distribution pattern $P_{Hi}$, the low-beam light distribution pattern $P_{Lo}$, and the light distribution pattern $P_{DRL}$ formed by a daytime miming lamp.

Figure 10A:
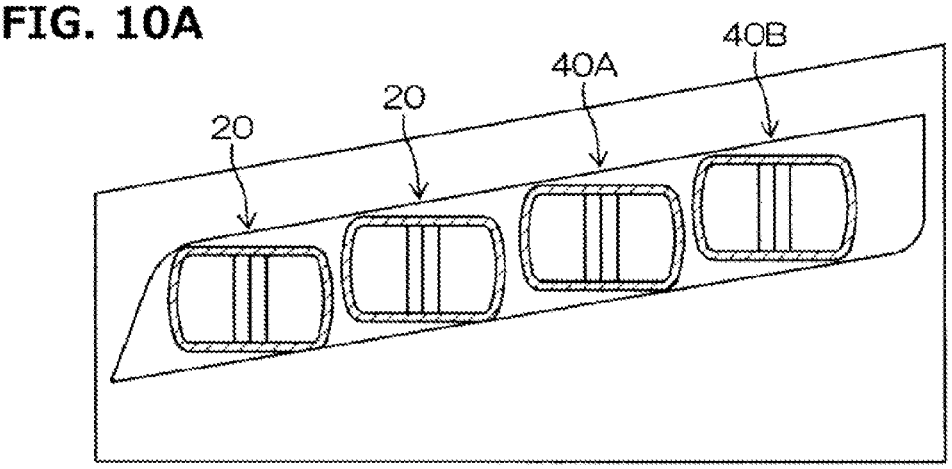
FIG. 10A is a front view of the vehicle lighting unit 10 (illustrating emission areas when the daytime running lamp light distribution pattern $P_{DRL}$ is formed, FIG. 10B is a front view of the vehicle lighting unit 10 (illustrating emission areas when the low-beam light distribution pattern $P_{Lo}$ is formed), and FIG. 10C is a front view of the vehicle lighting unit 10 (illustrating emission areas when the high-beam light distribution pattern $P_{Hi}$ is formed)
Figure 10B:
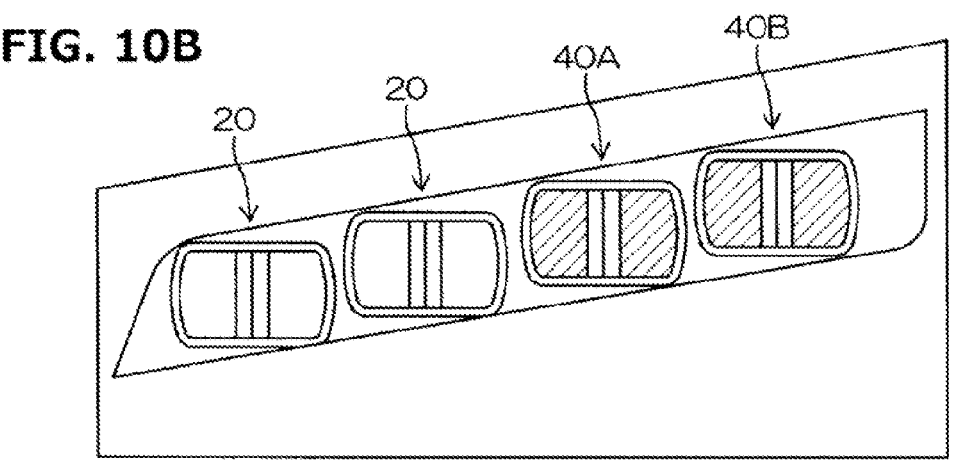
Figure 10C:
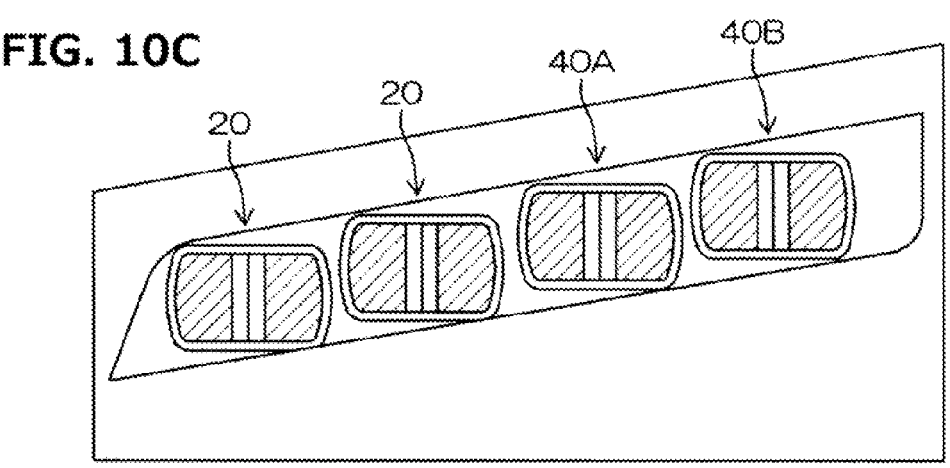
Figure 11A:
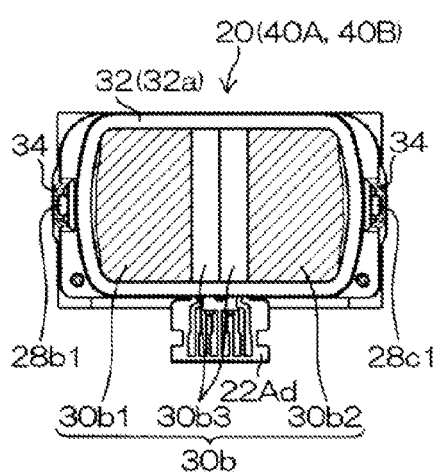
FIG. 11A is a front view of the optical module 20 (illustrating emission areas when the high-beam light distribution pattern $P_{Hi}$ or the low-beam light distribution pattern $P_{Lo}$ is formed)
Figure 11B:
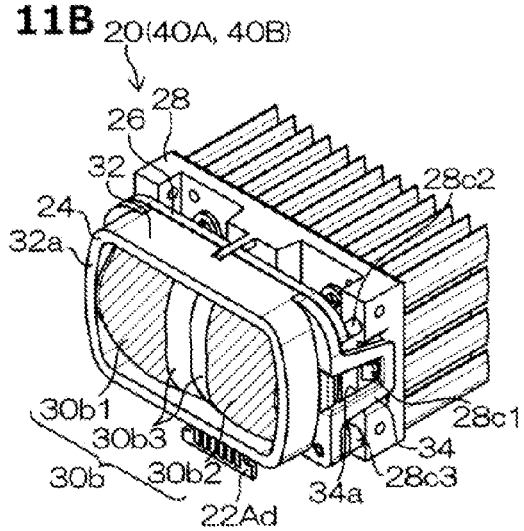
FIG. 11B is a perspective view of the optical module 20 (illustrating emission areas when the high-beam light distribution pattern $P_{Hi}$ or the low-beam light distribution pattern $P_{Lo}$ is formed)
Figure 11C:
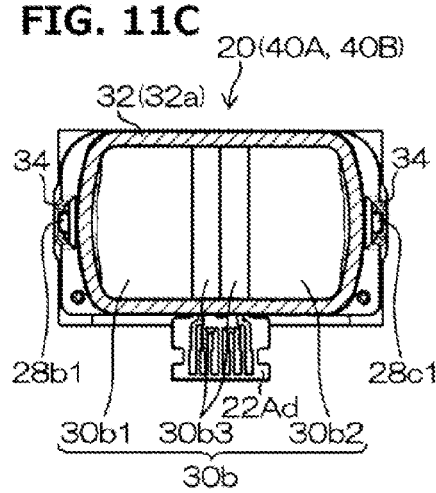
FIG. 11C is a front view of the optical module 20 (illustrating emission areas when the daytime running lamp light distribution pattern $P_{DRL}$ is formed)
Figure 11D:
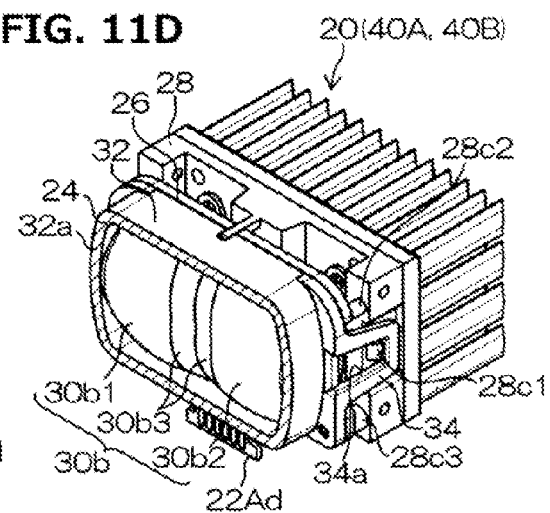
FIG. 11D is a perspective view of the optical module 20 (illustrating emission areas when the daytime running lamp light distribution pattern $P_{DRL}$ is formed)

For example, when the high-beam light distribution pattern $P_{Hi}$ is to be formed, the respective optical modules 20, 40A, and 40B (the respective center light sources 22A, and right and left light sources 22BR and 22BL) can be controlled so that the right and left light sources 22BR and 22BL of the respective optical modules 20, 40A, and 40B are turned off while the center light sources 22A of the respective optical modules 20, 40A, and 40B are turned on as illustrated in FIG. 10C. In FIG. 10C, the hatched areas represent the light emission areas by turning on the center light sources 22A of the respective optical modules 20, 40A, and 40B. FIGS. 11A and 11B represent light emission modes of the respective optical modules 20, 40A, and 40B.

As described above, the respective optical modules 20, 40A, and 40B (the respective center light sources 22A, and right and left light sources 22BR and 22BL) can be controlled to be turned ON or OFF, so that the high-beam light distribution pattern $P_{Hi}$ can be generated by overlaying the light collecting area P1 formed by the two high-beam optical modules 20, the light collecting area P2 formed by the low-beam optical module 40A, and the light diffusion area P3 formed by the low-beam optical module 40B on one another, as illustrated in FIG. 6C.

For example, when the low-beam light distribution pattern $P_{Lo}$ is to be formed, the respective optical modules 20, 40A, and 40B (the respective center light sources 22A, and right and left light sources 22BR and 22BL) can be controlled so that the right and left light sources 22BR and 22BL of the respective optical modules 20, 40A, and 40B and the center light source 22A of the high-beam optical modules 20 are turned off while the center light sources 22A of the respective optical modules 40A, and 40B are turned on as illustrated in FIG. 10B. In FIG. 10B, the hatched areas represent the light emission areas by turning on the center light sources 22A of the optical modules 40A, and 40B. FIGS. 11A and 11B represent light emission modes of the respective optical modules 20, 40A, and 40B.

As described above, the respective optical modules 20, 40A, and 40B (the respective center light sources 22A, and right and left light sources 22BR and 22BL) can be controlled to be turned ON or OFF, so that the low-beam light distribution pattern $P_{Lo}$ can be generated by overlaying the light collecting area P2 formed by the low-beam optical module 40A, and the light diffusion area P3 formed by the low-beam optical module 40B on each other, as illustrated in FIG. 6B.

Furthermore, when the light distribution pattern $P_{DRL}$ by a daytime miming lamp is to be formed, the respective optical modules 20, 40A, and 40B (the respective center light sources 22A, and right and left light sources 22BR and 22BL) can be controlled so that the right and left light sources 22BR and 22BL of the respective optical modules 20, 40A, and 40B are turned on while the center light sources 22A of the respective optical modules 20, 40A, and 40B are turned off as illustrated in FIG. 10A. In FIG. 10A, the hatched areas represent the light emission areas by turning on the right and left light sources 22BR and 22BL of the respective optical modules 20, 40A, and 40B. FIGS. 11A and 11B represent light emission modes of the respective optical modules 20, 40A, and 40B.

As described above, the respective optical modules 20, 40A, and 40B (the respective center light sources 22A, and right and left light sources 22BR and 22BL) can be controlled to be turned ON or OFF, so that the light distribution pattern $P_{DRL}$ by a daytime running lamp can be generated by overlaying the light distribution pattern $P_{DRL}$ by a daytime running lamp formed by the respective optical modules 20, 40A, and 40B on one another, as illustrated in FIG. 6A.

As described above, according to the vehicle lighting unit 10 with the respective optical modules 20, 40A, and 40B in the present exemplary embodiment, a plurality of lamps such as a headlamp, a daytime running lamp, and the like can be arranged within a limited area. This is because the outer peripheral optical member 32 is arranged to surround the first optical member 24 at its outer periphery as well as the structure (including the right and left light sources 22BR and 22BL and the second optical member 26) for achieving the second lamp (for example, a daytime running lamp) is disposed behind the structure (including the first optical member 24) for achieving the first lamp (for example, a headlamp) when viewed from the front side of the lighting unit.

A description will now be given of modified examples.

In the above exemplary embodiment, the front surface 32a of the outer peripheral light guiding section 32 of the first optical member 24 has been described to be a plane perpendicular to the optical axis $AX_{22BR(22BL)}$. However, the presently disclosed subject matter is not limited thereto.

For example, at least one lens cut can be provided in the front surface 32a of the outer peripheral light guiding section 32 of the first optical member 24. With this configuration, the adjustment of the shape of the lens cut to be formed in the front surface 32a of the outer peripheral light guiding section 32 of the first optical member 24 so that the exiting light is directed to a target direction can impart another function to the lamp to serve as a width indicator or a direction indicator, for example.

In the above exemplary embodiment, the first optical member 24 has been described to integrally include the outer peripheral light guiding section 32 (corresponding to the outer peripheral optical member of the presently disclosed subject matter). However the presently disclosed subject matter is not limited thereto.

Figure 12:
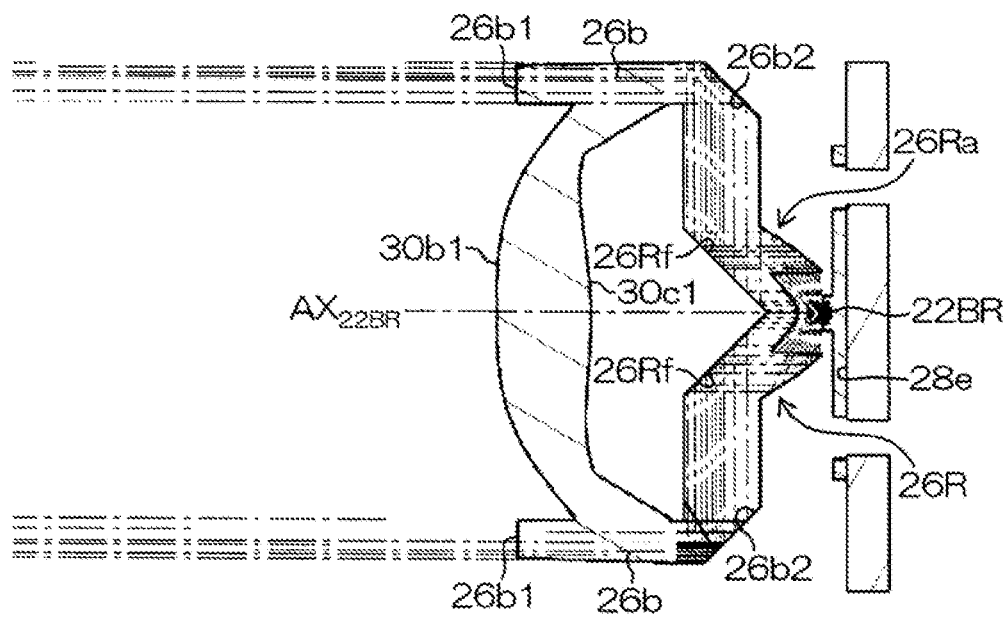
FIG. 12 is a cross-sectional view illustrating a modified example of the second optical member 26.

For example, as illustrated in FIG. 12, the outer peripheral light guiding section 32 can be omitted from the first optical member 24. In this case, the outer peripheral light guiding section 26b of the second optical member 26 can be extended forward to serve as the outer peripheral optical member of the presently disclosed subject matter.

Furthermore, the above-described exemplary embodiment has dealt with the case where each of the optical modules 20, 40A, 40B can be configured to include the center light source 22A, right and left light source 22BR and 22BL, first optical member 24 configured to control the light from the center light source 22A, and second optical member 26 configured to control the light from the right and left light sources 22BR and 22BL. However, the presently disclosed subject matter is not limited thereto.

Figure 13A:
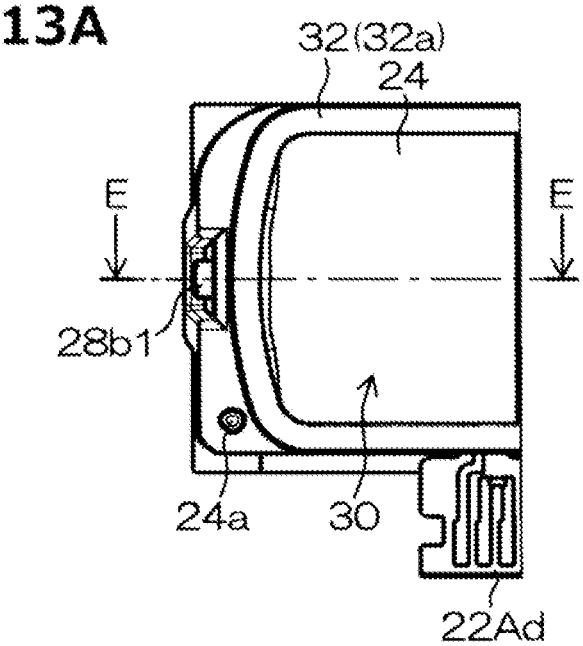
FIG. 13A is a front view illustrating a modified example of the optical module 20 and FIG. 13B is a cross-sectional view of the optical module 20 taken along line E-E illustrated in FIG. 13A.
Figure 13B:
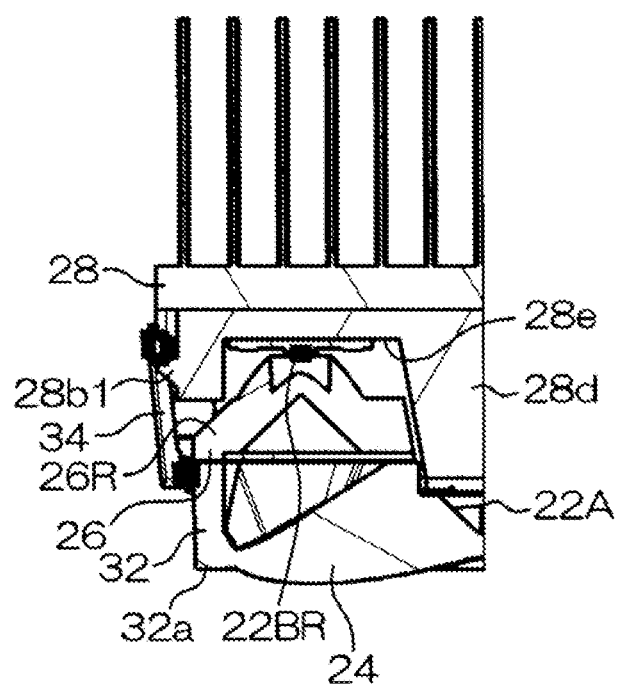

For example, as illustrated in FIG. 13A and FIG. 13B, each of the optical modules 20, 40A, 40B can be configured to include a center light source 22A, a right (or left) light source 22BR (22BL), a first optical member 24 configured to control the light from the center light source 22A, and a second optical member 26 configured to control the light from the right (or left) light source 22BR (22BL).

Furthermore, each of the optical modules 20, 40A, and 40B can be configured such that the pair of front surfaces 30a (and the pair of rear surfaces 30c) can be adjacent to each other not only horizontally but also vertically or diagonally.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising
    at least one optical module comprising
        a first light source having a first semiconductor light emitting element;
        a second light source having a second semiconductor light emitting element;
        a first optical member configured to control light from the first light source;
        a second optical member configured to control light from the second light source; and
        an outer peripheral optical member configured to surround the first optical member at an outer periphery of the first optical member, wherein
    the first optical member includes an incident surface, a front surface, and a rear surface and is configured to receive light from the first light source through the incident surface and reflect the light by at least part of the front surface and then by at least part of the rear surface to project the reflected light through at least part of the front surface,
    the outer peripheral optical member includes a front surface and a rear surface and is configured to project light through the front surface forward,
    the second optical member includes a light guiding member having an incident surface, a reflection surface, and a front surface and is configured to receive the light from the second light source through the incident surface and reflect at least part of the light by the reflection surface so as to travel through the light guiding member, and exit through the front surface so as to surround the first optical member, to irradiate the rear surface of the outer peripheral optical member with the light, and
    the second light source, and the second optical member are disposed behind the first optical member.

2. The vehicle lighting unit according to claim 1, wherein the optical module further comprises a support member configured to support the first light source, the second light source, the first optical member, and the second optical member, and
    the second light source and the second optical member can be disposed between the first optical member and the support member.

3. The vehicle lighting unit according to claim 2, wherein the support member includes a base section having a front surface and a seat section projected from the front surface of the base section forward, and the first optical member has a rear surface arranged in front of an area of the front surface of the base section except for the seat section with the first light source fixed to the seat section and the second light source fixed to the area of the front surface of the base section except for the seat section.

4. A vehicle lighting unit comprising
at least one optical module comprising:
- a first light source having a first semiconductor light emitting element;
- a second light source having a second light emitting element;
- a third light source having a third semiconductor light emitting element;
- a first optical member configured to control light from the first light source;
- a second optical member configured to control light from the second light source and light from the third light source; and
- an outer peripheral optical member configured to surround the first optical member at an outer periphery of the first optical member, wherein the first optical member includes an incident surface on which light from the first light source can be incident, a pair of front surfaces arranged adjacent to each other in a first direction, and a pair of rear surfaces arranged adjacent to each other in the first direction and is configured to receive light from the first light source through the incident surface and reflect the light by at least part of the pair of front surfaces and then by at least part of the pair of rear surfaces to project the reflected light through at least part of the pair of front surfaces, the outer peripheral optical member includes a front surface and a rear surface and is configured to project light through the front surface forward, the second optical member includes a light guiding member having an incident surface, a reflection surface, and a front surface and a rear surface and is configured to receive the light from the second light source and the third light source through the incident surface and reflect at least part of the light by the reflection surface so as to travel through the light guiding member, and exit through the front surface to irradiate the rear surface of the outer peripheral optical member with the light, and the second light source, the third light source, and the second optical member are disposed behind the first optical member.

5. The vehicle lighting unit according to claim 4, wherein the optical module further comprises a support member configured to support the first light source, the second light source, the third light source, the first optical member, and the second optical member, and the second light source, the third light source, and the second optical member are disposed between the first optical member and the support member.

6. The vehicle lighting unit according to claim 5, wherein the support member includes a base section having a front surface and a seat section projected from the front surface of the base section forward with a first area and a second area arranged on respective sides of the seat section, and the pair of rear surfaces of the first optical member are arranged in front of the first area and the second area, with the first light source fixed to the seat section, the second light source fixed to the first area, and the third light source fixed to the second area.

7. A vehicle lighting unit comprising
at least one optical module comprising
- a first light source having a first semiconductor light emitting element;
- a second light source having a second semiconductor light emitting element;
- a first optical member configured to control light from the first light source;
- a second optical member configured to control light from the second light source; and
- an outer peripheral optical member configured to surround the first optical member at an outer periphery of the first optical member, wherein the first optical member includes an incident surface, a front surface, and a rear surface and is configured to receive light from the first light source through the incident surface and reflect the light by at least part of the front surface and then by at least part of the rear surface to project the reflected light through at least part of the front surface, the second optical member includes a light guiding member having an incident surface and a reflection surface, and is configured to receive the light from the second light source through the incident surface and reflect at least part of the light by the reflection surface so as to travel through the light guiding member, and exit through the front surface to irradiate the outer peripheral optical member with the light, the outer peripheral optical member includes a front surface, is formed to be united at a rear portion with the second optical member at a front portion thereof, and is configured project light through the front surface forward, and the second light source and the second optical member are disposed behind the first optical member.

* * * * *